(12) United States Patent
Fee

(10) Patent No.: US 6,266,170 B1
(45) Date of Patent: Jul. 24, 2001

(54) METHOD AND SYSTEM FOR COMPENSATING FOR CHROMATIC DISPERSION IN AN OPTICAL NETWORK

(75) Inventor: John Arthur Fee, Richardson, TX (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/338,243

(22) Filed: Jun. 22, 1999

(51) Int. Cl.$^7$ .................................................. H04B 10/18
(52) U.S. Cl. ............................................ 359/161; 359/173
(58) Field of Search ................................... 359/127, 130, 359/161, 173, 177, 179, 187, 193

(56) References Cited

U.S. PATENT DOCUMENTS

| | | | |
|---|---|---|---|
| 5,602,666 | * 2/1997 | Ishikawa et al. | 359/161 |
| 5,608,562 | * 3/1997 | Delavaux et al. | 359/161 |
| 5,715,265 | * 2/1998 | Epworth | 372/38 |
| 5,717,510 | * 2/1998 | Ishikawa et al. | 359/161 |
| 5,982,530 | * 11/1999 | Akiyama et al. | 359/279 |
| 6,081,360 | * 6/2000 | Ishikawa et al. | 359/161 |

FOREIGN PATENT DOCUMENTS

11068657 * 3/1999 (JP).
11251973 * 9/1999 (JP).

* cited by examiner

*Primary Examiner*—Leslie Pascal
(74) *Attorney, Agent, or Firm*—Sawyer Law Group LLP

(57) ABSTRACT

The present invention provides a method and system for compensating for chromatic dispersion in an optical network. The method and system includes analyzing an optical signal at a first location in the optical network and determining if an eye of the optical signal has a desired shape at the first location. The method and system further includes automatically adjusting a dispersion of the optical signal at a second or at any location in the optical network if the optical signal does not have the desired shape; providing feedback concerning the shape of the adjusted optical signal at the first location; and automatically readjusting the dispersion of the optical signal at the second location based upon the feedback until the optical signal has the desired shape at the first location. The method and system of the present invention automatically compensates for dispersion in an optical system. This saves the network operator considerable time and raises the reliability. The method and system could be used to provide a continuous range of dispersion compensation to particular locations in the network or to the network as a whole, and to store information in a database to be used to produce dispersion maps for the network. It also provides the ability to dial in dispersion for changing fiber characteristics and pre-tuning in a switching of wavelengths from one system to another. Finally, it avoids extraordinary expense by allowing the approximation of the installed fiber dispersion without requiring field measurements.

10 Claims, 14 Drawing Sheets

METHOD AND SYSTEM FOR COMPENSATING FOR CHROMATIC DISPERSION IN AN OPTICAL NETWORK

FIELD OF THE INVENTION

The present invention relates to fiber optic networks, and more particularly to chromatic dispersion compensation in fiber optic networks.

BACKGROUND OF THE INVENTION

Fiber optic networks are becoming increasingly popular for data transmission due to their high speed, high capacity capabilities. FIG. 1 illustrates a simplified optical network 100. A fiber optic network 100 could comprise a main loop 150, which connects primary locations, such as San Francisco and New York. In between the primary locations are local loops 110, 120, which connect with the main loop 150 at connector points 140 and 160. A local loop could be, for example, an optical system servicing a particular area. Thus, if local loop 110 is Sacramento, an optical signal would travel from San Francisco, add and drop channels with Sacramento's signal at connector point 140, and the new signal would travel forward to connector point 160 where channels are added and dropped with local loop 120, and eventually to New York. Within loop 110, optical signals would be transmitted to various locations within its loop, servicing the Sacramento area. Local receivers 170 would reside at various points within the loop to convert the optical signals into signals in the appropriate protocol format. Loops 110 and 120 may also exchange channels directly with each other through a connector point 130 between them.

A common and well-known problem in the transmission of optical signals is chromatic dispersion of the optical signal. Chromatic dispersion refers to the effect where the channels within a signal travel through an optic fiber at different speeds, i.e.; longer wavelengths travel faster than shorter wavelengths. This is a particular problem becomes more acute for data transmission speeds higher than 2.5 gigabits per second. The resulting pulses of the signal will be stretched, possibly overlap, and make it more difficult for a receiver to distinguish where one pulse begins and another ends. This seriously compromises the integrity of the signal.

A conventional solution to this problem is the use of fixed dispersion compensators at various locations in the network as needed. These devices compensate for a fixed dispersion value by canceling the dispersion in the fiber link. The difficulty with using fixed dispersion compensators is that an optical link or network is rarely uniform. Different systems in the network may use different types of fiber, as well as different types of receivers with different tolerances. The fibers within a system may be of different lengths necessitated by landscapes, building locations, etc. Also, different systems may contain devices from different vendors, each with its own dispersion tolerance. Thus, in order to obtain as close to optimum dispersion compensation through the entire system, the dispersion must be manually determined for every fiber and optical in the system, and a dispersion compensator with the appropriate fixed value must be purchased and installed. This solution is costly to the network operator in both money and time. Many hours of human labor must be expended to measure the dispersion of each fiber in the system and to order, inventory, install, and setup the fixed dispersion compensators. To do the job properly at extremely high bit rates, a network operator must remove transmission traffic from the fiber link, measure the dispersion in the fiber link, and then manually insert the fixed dispersion compensator. Many operators "guess" at the dispersion based upon the length of the fiber and statistics of dispersion. They then order a fixed dispersion compensator, which approximates the dispersion. For example, assume the residual dispersion using conventional dispersion compensation at the end of a fiber transmitting a standard NRZ pulse format has a value of 1200 ps/nm. The "guess" method will work for a pulse of 2.4 Gb/s, will be difficult to achieve at 10 Gb/s, and will not work at 40 Gb/s. Thus, the operator must "guess" within the dispersion tolerance. In general, if the residual dispersion of the transmission link is less than the dispersion tolerance of the Transceiver, the system will operate properly. At extremely high bit rates such as 40 Gb/s, meeting this condition will be extremely rare.

Accordingly, there exists a need for a method and system for automatically compensating for chromatic dispersion in an optical network, which does not require the manual determination, installation and purchase of a dispersion compensation of a fixed value. The method will save network operators both money and time. The present invention addresses such a need.

SUMMARY OF THE INVENTION

The present invention provides a method and system for compensating for chromatic dispersion in an optical network. The method and system includes analyzing an optical signal at a first location in the optical network and determining if an eye of the optical signal has a desired shape at the first location. The method and system further includes automatically adjusting a dispersion of the optical signal at a second or at any location in the optical network if the optical signal does not have the desired shape; providing feedback concerning the shape of the adjusted optical signal at the first location; and automatically readjusting the dispersion of the optical signal at the second location based upon the feedback until the optical signal has the desired shape at the first location. The method and system of the present invention automatically compensates for dispersion in an optical system. This saves the network operator considerable time and raises the reliability. The method and system could be used to provide a continuous range of dispersion compensation to particular locations in the network or to the network as a whole, and to store information in a database to be used to produce dispersion maps for the network. It also provides the ability to dial in dispersion for changing fiber characteristics and pre-tuning in a switching of wavelengths from one system to another. Finally, it avoids extraordinary expense by allowing the approximation of the installed fiber dispersion without requiring field measurements.

DETAILED DESCRIPTION

The present invention is a method for compensating for chromatic dispersion in an optical network. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 14 in conjunction with the discussion below.

Figure 1:
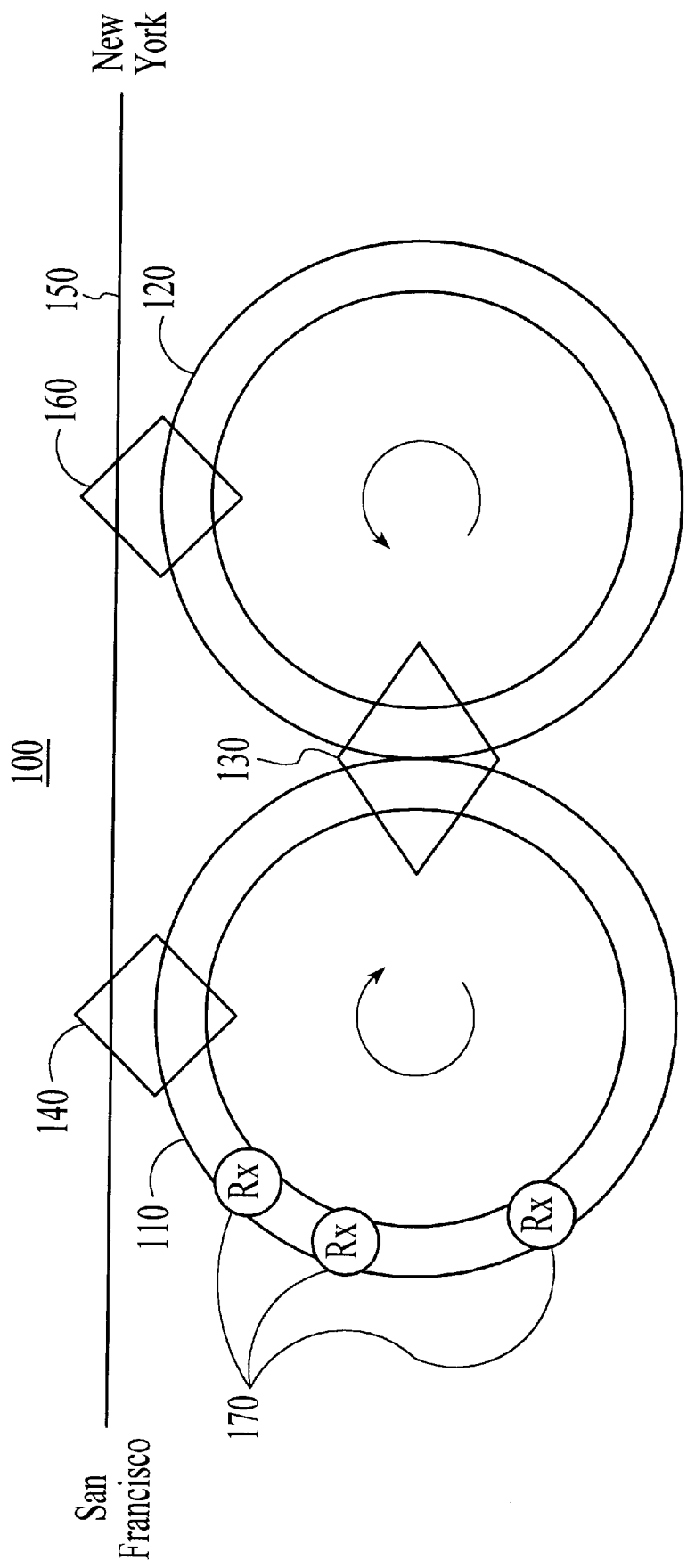
FIG. 1 illustrates a conventional optical network.
Figure 2:
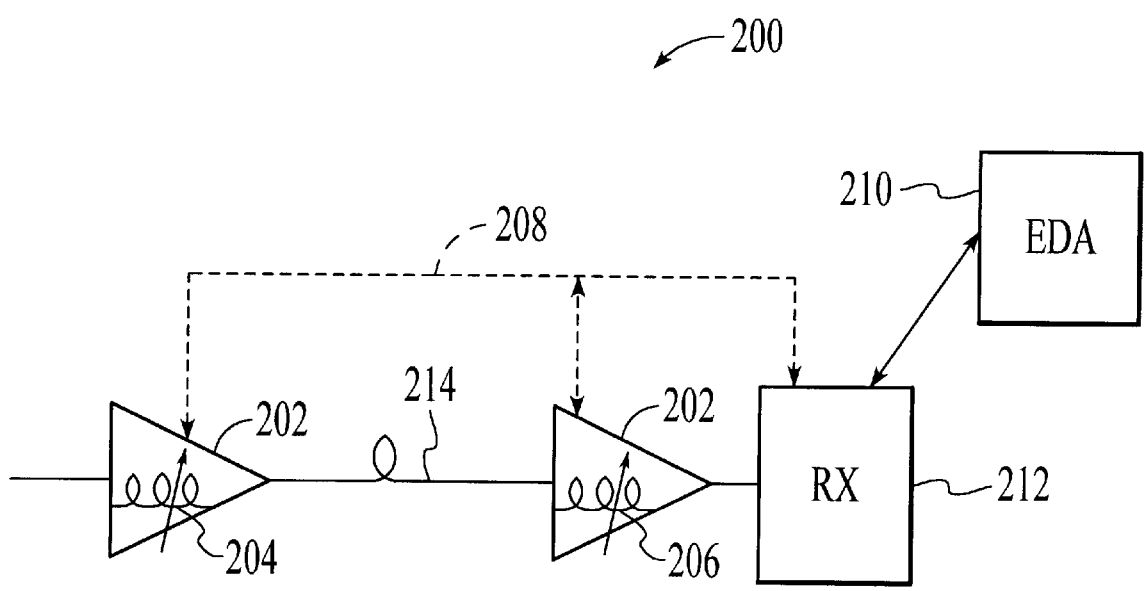
FIG. 2 illustrates a preferred embodiment of a system using the method of providing tunable dispersion compensation in accordance with the present invention.

The method of the present invention uses a tunable dispersion compensator (TDC) in an optical network. FIG. 2 illustrates a preferred embodiment of a system 200, which uses the method of the present invention. The network 200 uses amplifiers 202 to compensate for signal loss or attenuation, a commonly known problem in optical networks. At each location of the amplifiers 202, TDC's 204, 206 are used.

Figure 3A:
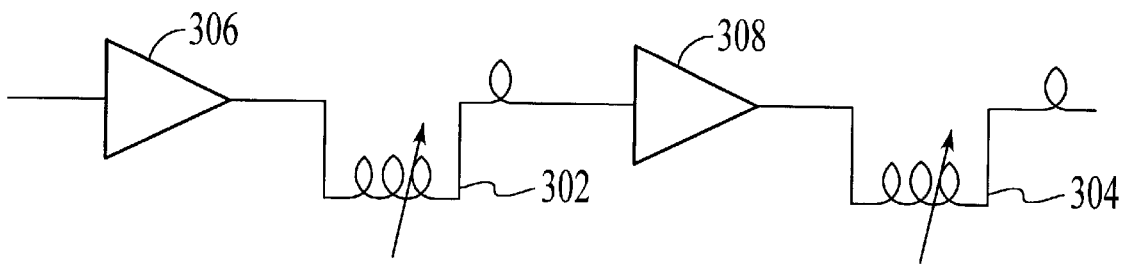
FIGS. 3A–3C illustrates possible locations of a tunable dispersion compensator in accordance with the present invention.
Figure 3B:
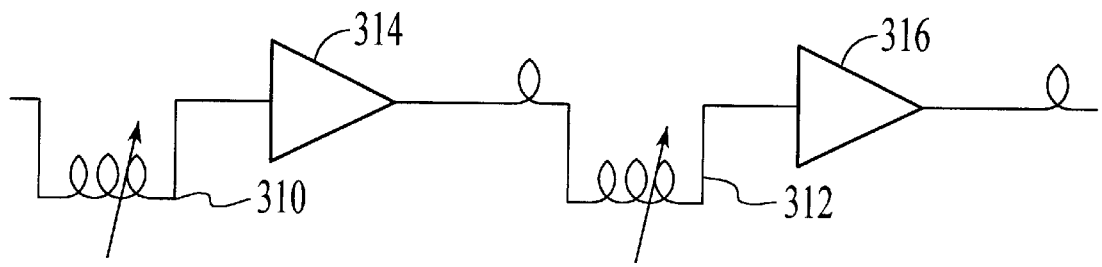
Figure 3C:
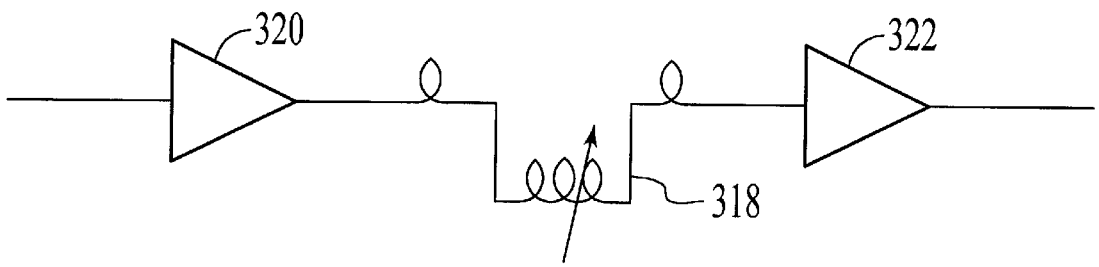

TDC's may also be located at other places in the network. FIGS. 3A–3C illustrate other possible locations. For example, as illustrated in FIG. 3A, TDC's 302 and 304 may be located at the transmitting end of the amplifiers 306 and 308 respectively. As illustrated in FIG. 3B, TDC's 310 and 312 may be located at the receiving end of the amplifiers 314 and 316 respectively. As illustrated in FIG. 3C, TDC 318 may be located in-between amplifiers 320 and 322. Although the variations of TDC locations are as illustrated in FIGS. 2–3C, one of ordinary skill in the art will understand that TDC's may be located elsewhere in the network without departing from the spirit and scope of the present invention.

The TDC's 204, 206 of FIG. 2 will be used in the following discussion of the features of a TDC in accordance with the present invention. However, this discussion is applicable to any of the disclosed TDC's 302, 304, 310, 312, 318.

Figure 4:
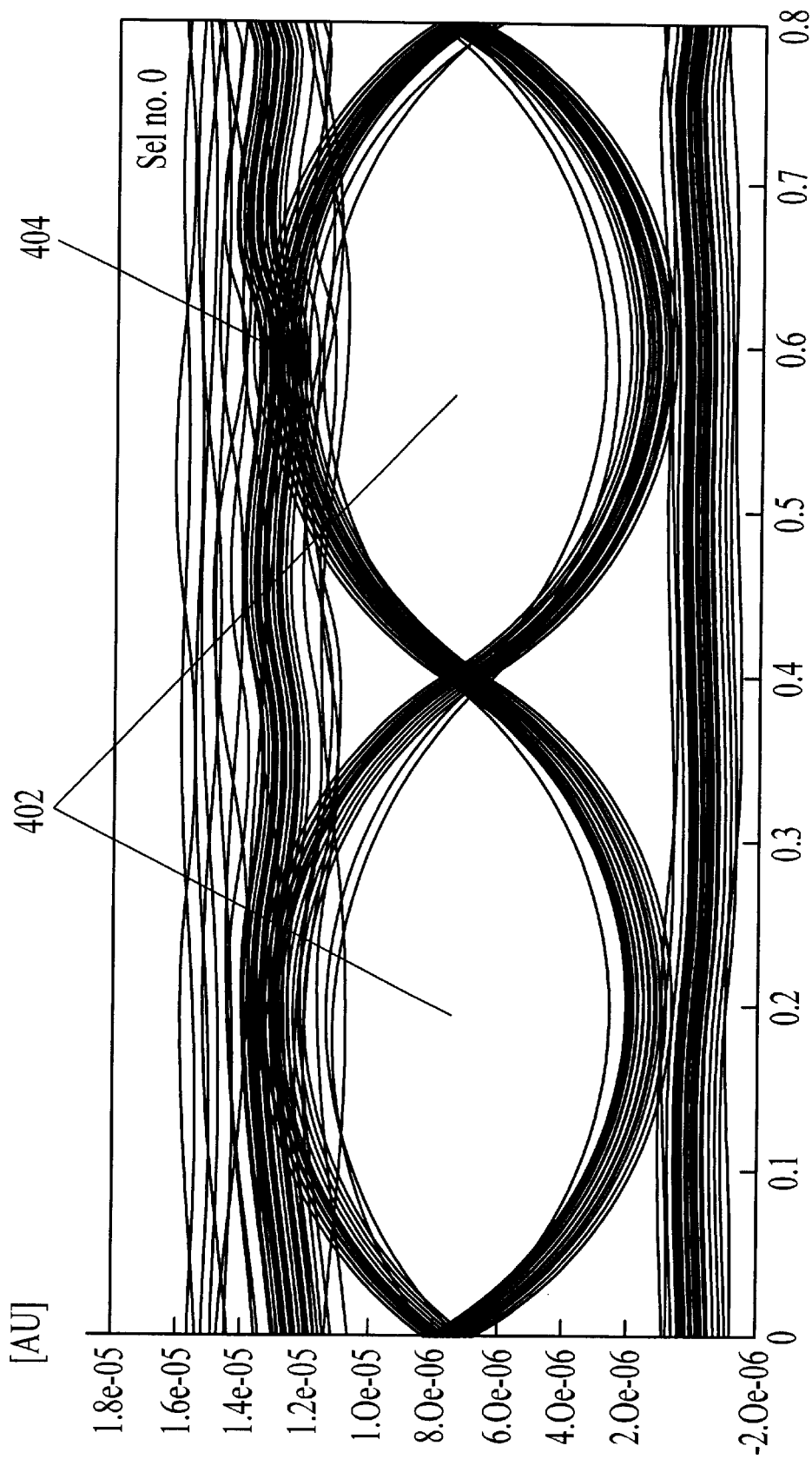
FIG. 4 illustrates a conventional eye diagram of an optical signal.

Returning to FIG. 2, the TDC's 204, 206 are automatically tuned by a performance monitoring mechanism 210 to fine tune the shape of the optical signal until an optimum shape is obtained. In the preferred embodiment, an Eye Diagram Analyzer 210 (EDA) at the receiver 212 analyzes the optical signal at the receiver 212 and feeds the information to the TDC's 204, 206 through a communications link 208. The EDA 210 measures the area of the "eye" 402 of the optical signal 404, as illustrated in FIG. 4. The "eye" 402 is the area between the peaks and opposing of the optical signal 404. For optimum performance, an optimum eye area should be obtained. An optimum area is the maximum opening between the NRZ pulse so that the receiver 212 has the most ease in picking the voltage and time coordinates. The eye diagram should, by analogy, look wide open similar to the human eye when fully open. The NRZ pulse and its eye area are well known in the art and will not be further described here. When chromatic dispersion distorts the signal, the eye 402 does not have an optimum area If the area is too small or is skewed or distorted, the receiver 212 not be able to determine if the signal is carrying a "1" or a "0" and may have difficulty locating the eye center, compromising the reliability of the data on the signal. This problem is well known in the art. The use of an EDA to measure the eye area is also well known in the art. An example is the EDA manufactured by HEWLETT-PACKARD.

Although the present invention is described with the EDA located at the receiver, one of ordinary skill in the art will understand that the EDA may be located elsewhere in the network without departing from the spirit and scope of the present invention. For example, an EDA may be located at each amplifier in the network such that the optical signal between the EDA and a prior IDC may be analyzed. For another example, instead of installing an EDA into the network, the EDA may be carried by a technician to the physical location of the amplifier, manually connect the EDA to the network at that location, and then optimize the optical signal. Other manners of utilizing the EDA are possible.

Although the present invention is described as using the EDA as the method of analyzing the shape of the optical signal, one of ordinary skill in the art will understand that other methods of analyzing the shape of the optical signal may be used without departing from the spirit and scope of the present invention. Examples of other methods include the Optical Signal to Noise measurement, the dBQ measurement, or the Bit Error Rate measurement. These methods are well known in the art and will not be described here.

Figure 5:
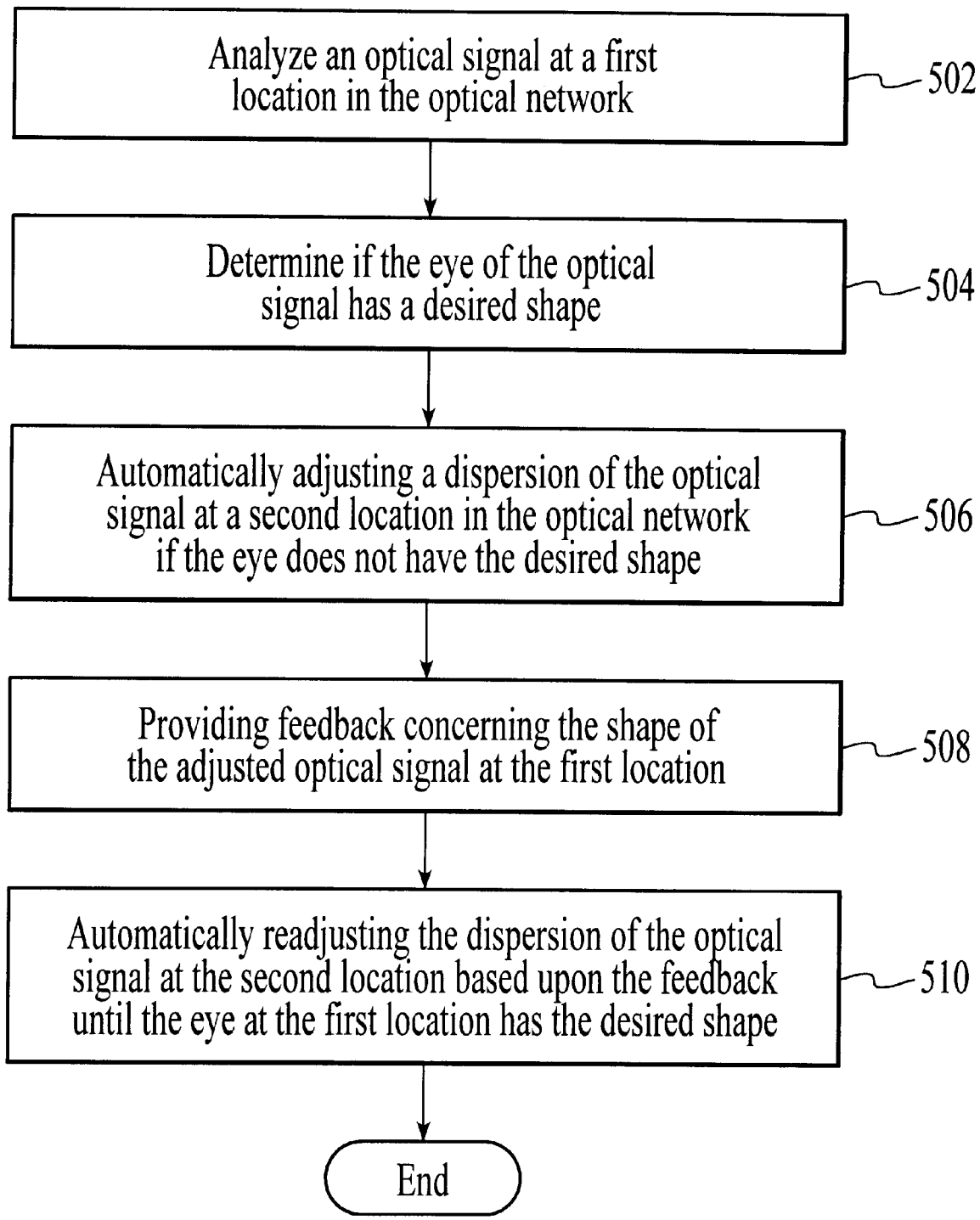
FIG. 5 is a flow chart illustrating a preferred embodiment of the method of providing tunable dispersion compensation in accordance with the present invention.

FIG. 5 is a simple flowchart illustrating the preferred embodiment of the method for tunable dispersion compensation in accordance with the present invention. First, an optical signal at a first location (such as at the receiver) in the optical network is analyzed before any tuning has begun, via step 502. Next, it is determined if the eye of the optical signal has a desired shape, via step 504. Shape determination is well known to the skilled at art. Then, the dispersion of the optical signal at a second location upstream from the first location in the optical network (such as at the tunable dispersion compensator) is automatically adjusted if the eye does not have a desired shape, via step 506. Feedback is then provided concerning the eye shape of the adjusted optical signal at the second location, via step 508. Thereafter, the dispersion of the optical signal is readjusted at the second location based upon the feedback until the eye at the first location has the desired shape, via step 510.

Figure 6:
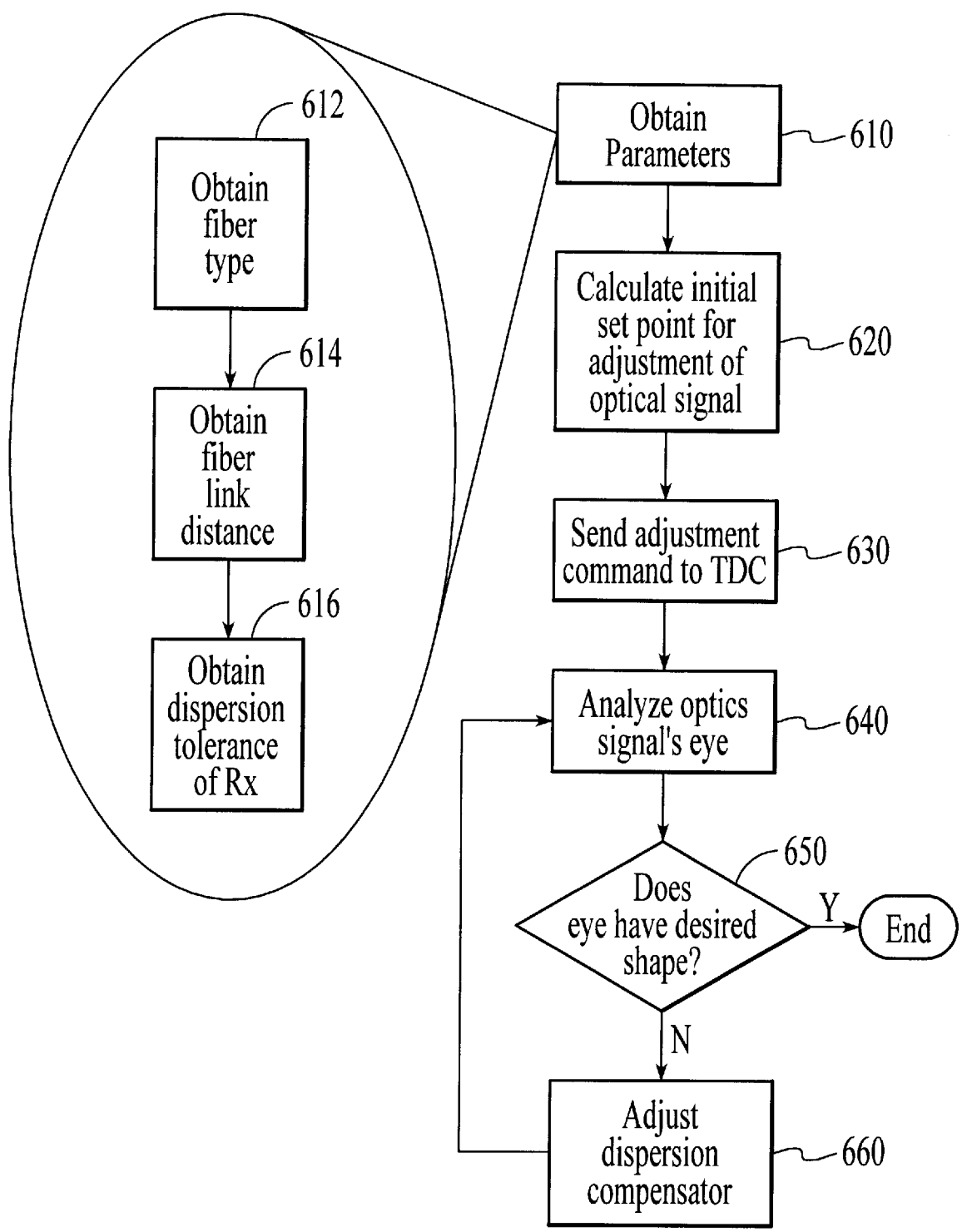
FIG. 6 is a flow chart illustrating in more detail the preferred embodiment of the method of providing tunable dispersion compensation in accordance with the present invention.

FIG. 6 is a flowchart illustrating in more detail the preferred embodiment of the method of the present invention. For illustrative purposes only, assume that the EDA 210 (FIG. 2) is located at a receiver 212 and the TDC 204 is located at amplifier 202. First, the EDA 210 obtains a set of parameters for the system, via step 610. In the preferred embodiment, the parameters obtained by the EDA 210 include the fiber type for the system, via step 612; the fiber link distance, i.e., the distance between the TDC 204 and the receiver 212, via step 614; and the dispersion tolerance of the receiver 212, via step 616. Using the parameters, the EDA 210 then calculates an initial set point for compensating the dispersion in the optical signal as it enters the system, via step 620. The EDA 210 sends a command to the TDC 204 through the communications link 208 to adjust the dispersion compensation to the set point, via step 530. Once adjusted, the EDA 210 analyzes the adjusted optical signal, via step 640. The EDA 204 then decides if the eye has the desired shape, via step 650. If not, then the EDA 210 calculates a new set point and commands the TDC 204 to adjust its dispersion compensation by a certain amount to reach the new set point, via step 660. The signal then is again analyzed by the EDA 210, via step 640. This analysis and adjustment continues until the desired eye shape is obtained.

Figure 7:
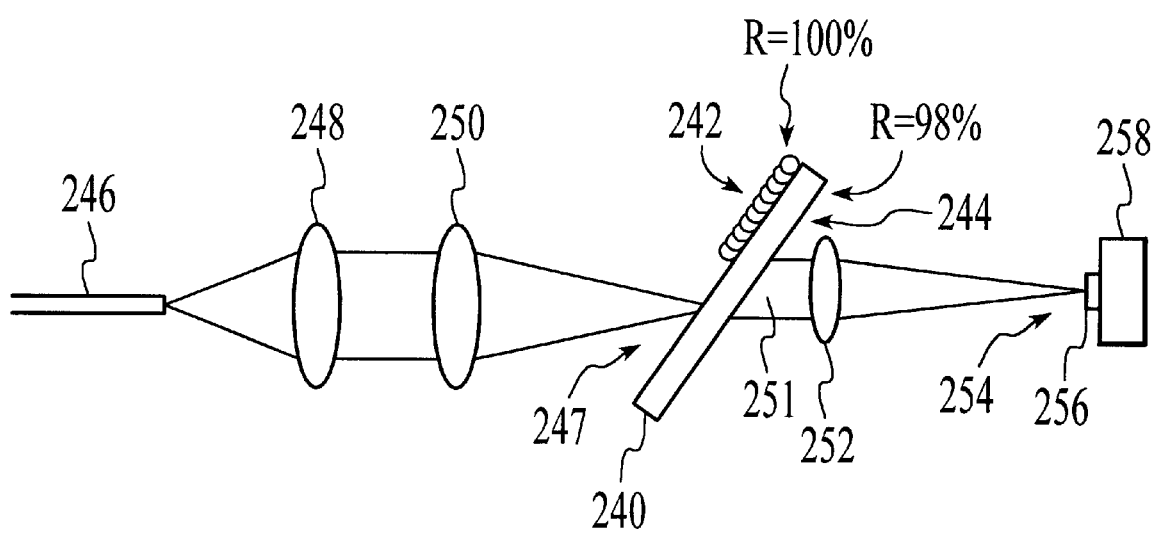
FIG. 7 illustrates a first preferred embodiment of a tunable dispersion compensator in accordance with the present invention.
Figure 8:
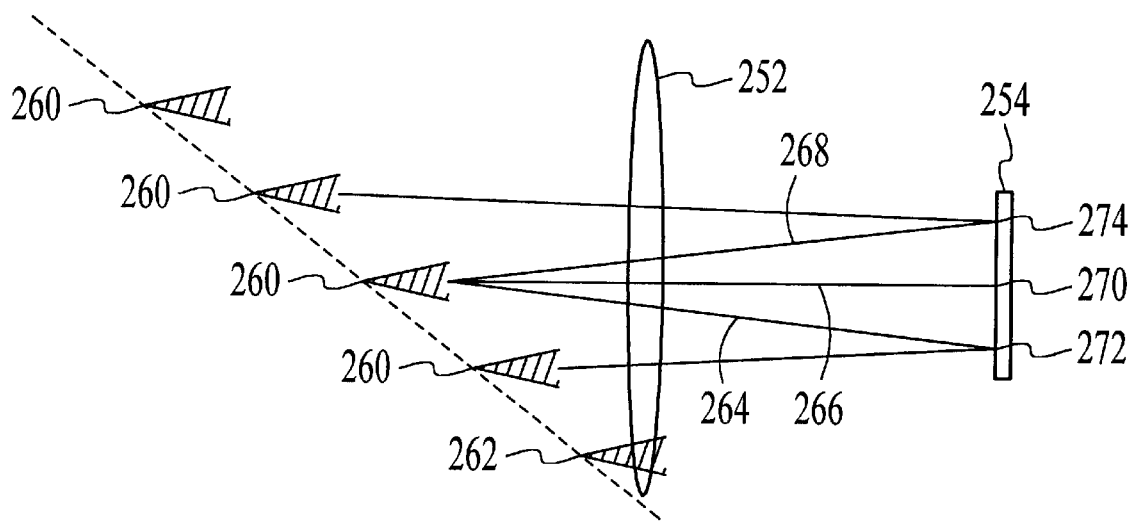
FIG. 8 illustrates in more detail the operation of the first preferred embodiment of a tunable dispersion compensator in accordance with the present invention.

FIGS. 7 and 8 illustrate a first preferred embodiment of a TDC, which may be used, with the method of the present invention. The first embodiment of the TDC has been disclosed in co-pending U.S. Patent Application entitled, "VIRTUALLY IMAGED PHASED ARRAY (VIPA) HAVING A VARYING REFLECTIVITY SURFACE TO IMPROVE BEAM PROFILE", Ser. No. 09/114,071, filed on Jul. 13, 1998, assigned to the assignee of the present application and is incorporated by reference herein.

The TDC 700 in FIG. 7 includes a virtually imaged phased array (VIPA) 240 in combination with a reflecting device 254, such as a mirror, to produce chromatic dispersion. The VIPA 240 has a first surface 242 with a reflectivity of, for example, approximately 100%, and a second surface 244 with a reflectivity of, for example, approximately 98%. The VIPA 240 also includes a radiation window 247. The VIPA 240 receives an input light having a respective wavelength within a continuous range of wavelengths. The VIPA 240 causes multiple reflections of the input light to produce differential delay and thereby form an output light signal. The output light is spatially distinguishable from an output light formed for an input light having any other wavelength within the continuous range of wavelengths.

As illustrated in FIG. 7, a light is output from a fiber 246, collimated by a collimating lens 248 and line-focused into VIPA 240 through radiation window 247 by a cylindrical lens 250. The line into which the light is focused is referred to in this specification as the "focal line". The VIPA 240 then produces a collimated light 251, which is focused by a focusing lens 252 onto a mirror 254. Mirror 254 can be a mirror portion 256 formed on a substrate 258.

Mirror 254 reflects the light back through focusing lens 252 into the VIPA 240. The light then undergoes multiple reflections in VIPA 240 and is output from radiation window 247. The light output from radiation window 247, travels through cylindrical lens 250, and collimating lens 248 and is received by fiber 246.

Therefore, light is output from VIPA 240 and reflected by mirror 254 back into VIPA 240. The light reflected by mirror 254 travels through the path, which is exactly opposite in direction to the path through which it originally traveled. Different wavelength components in the light are focused onto different positions on mirror 254, and are reflected back to VIPA 240. As a result, different wavelength components travel different distances, to thereby produced adjustable chromatic dispersion. The VIPA 240 can be used to compensate for chromatic dispersion in all channels of a wavelength division multiplexed light.

FIG. 8 illustrates in more detail the operation of the VIPA 240 in FIG. 7. Assume a light having various wavelength components is received by the VIPA 240. The VIPA 240 will cause the formation of virtual images 260 of beam waist 262, where each virtual image 260 emits light. A "beam waist", as used in this specification, is the width of the focal line, a cross-section of which is displayed in FIG. 8.

As illustrated in FIG. 8, focusing lens 252 focuses the different wavelength components in a collimated light from VIPA 240 at different points on the mirror 254. More specifically, longer wavelength 264 focuses at point 272, center wavelength 266 focuses at point 270 and shorter wavelength 268 focuses at point 274. Then, longer wavelength 264 returns to a virtual image 260, which is closer to beam waist 262, as compared to center wavelength 266. Shorter wavelength 268 returns to a virtual image 260, which is farther from, beam waist 262, as compared to center wavelength 266.

By adjusting the distances between the combination of the VIPA 240/lens 252, and the mirror 254, the amount of chromatic dispersion produced may be adjusted. Thus, at step 660 of FIG. 6, manipulating the locations of the VIPA 240/lens 252 combination, and the mirror 254 performs the adjustment for dispersion compensation.

Figure 9:
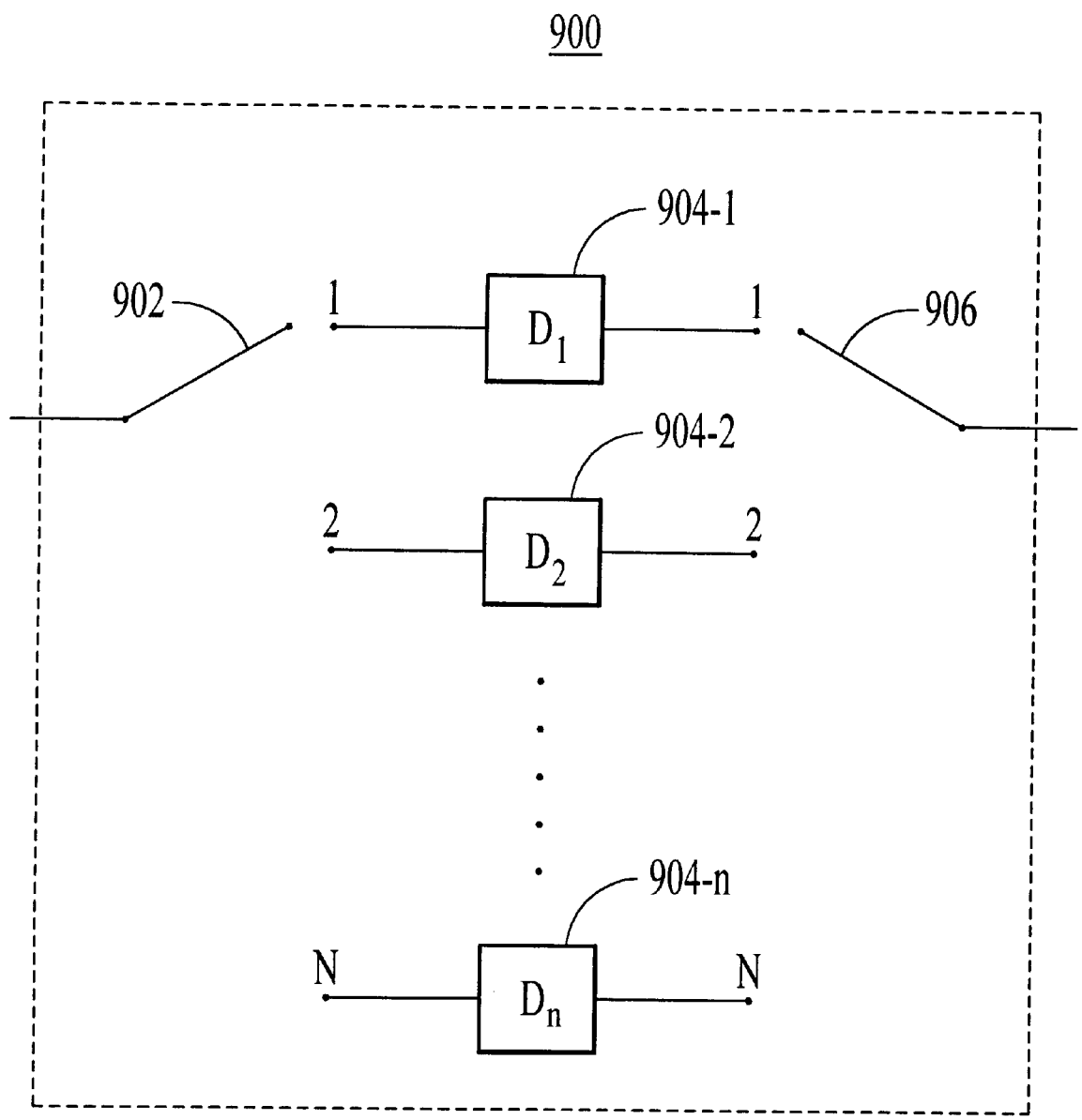
FIG. 9 illustrates a second preferred embodiment of a tunable dispersion compensator in accordance with the present invention.

FIG. 9 illustrates a second preferred embodiment of a TDC 900, which may be used, with the method of the present invention. This second embodiment provides discretely tunable dispersion compensation. The TDC 900 includes a 1×N optical switch 902. The switch 902 is capable of routing the input signal along one of N possible paths. Each path has a conventional fixed dispersion compensator, 904-1 through 904-n, which provides different amounts of dispersion. The compensated signal is then output through another 1×N optical switch 906. Thus, the second embodiment of a TDC 900 is discretely tunable. At step 660 of FIG. 6, the adjustment for dispersion compensation is performed with the optical switch 902 routing the input signal to the path which will adjust the chromatic dispersion by a certain amount based upon the command sent by the EDA 210.

Figure 10:
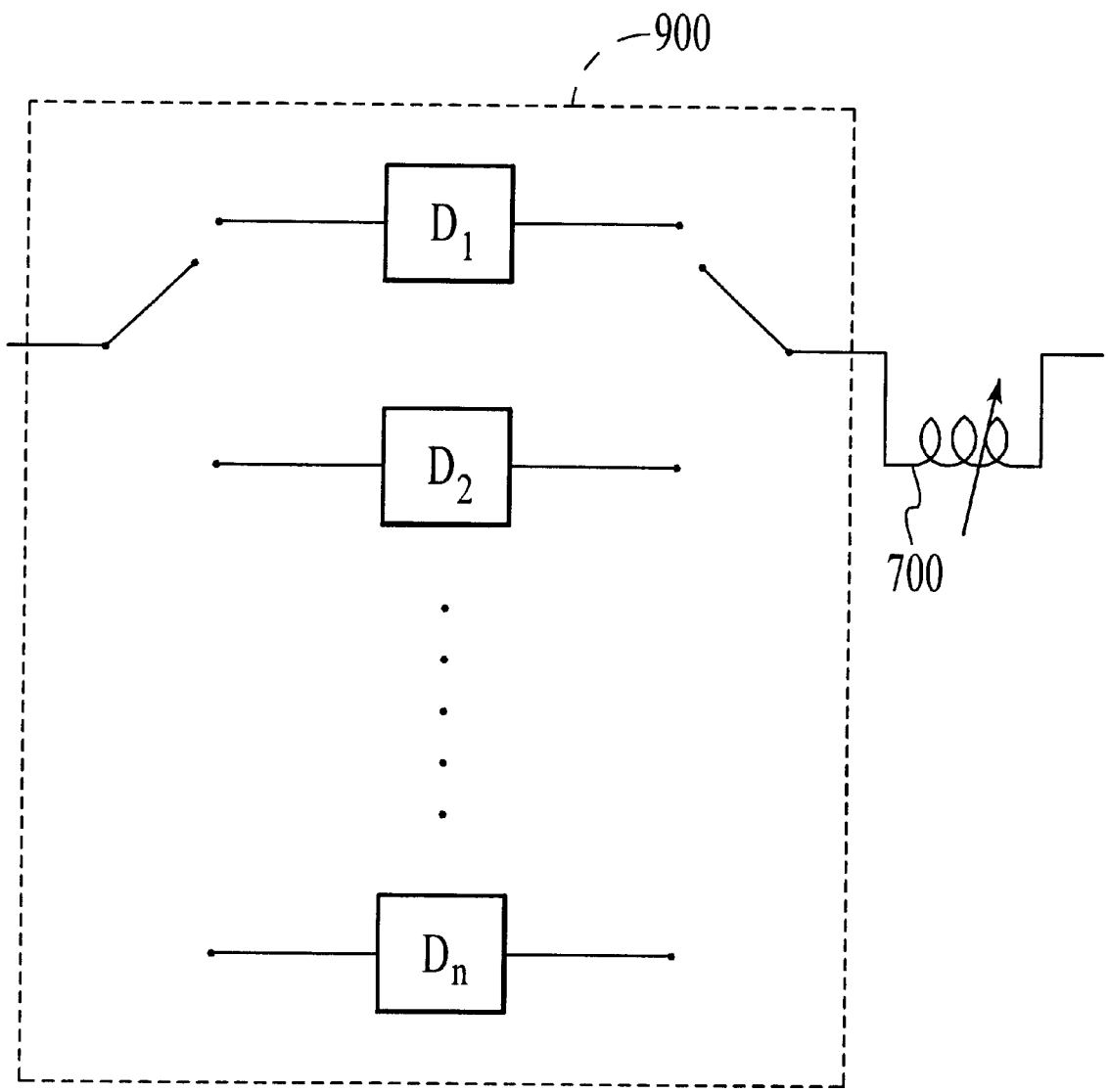
FIG. 10 illustrates a third preferred embodiment of a tunable dispersion compensator in accordance with the present invention.

FIG. 10 illustrates a third embodiment of a TDC 1000, which may be used, with the method of the present invention. This third embodiment couples a TDC 900 of the second embodiment with a TDC 700 of the first embodiment. With this TDC 1000, coarse dispersion compensation is provided by the TDC 900 through the routing of the input signal along one of N possible paths. The coarsely compensated signal is then finely tuned by the TDC 700.

One advantage of this embodiment is the speed at which dispersion compensation occurs. When dispersion compensation occurs with the TDC 700 alone, the TDC 700 must provide a large range of dispersion. But coupled with the TDC 900, the dispersion adjustment required by the TDC 700 is smaller, resulting in a faster compensation speed.

For example, assume that the optical signal, which enters TDC 1000 with a dispersion of +1800 nm, and the desired dispersion, is −650 nm. If the TDC 700 was alone, it must compensate for 1450 nm. However, with the TDC 1000, TDC 900 can provide a coarse compensation value of, for example, 1400 mn. Then TDC 700 only need to provide a fine compensation value of 50 nm. A small compensation value may be provided faster than a larger one. Thus, the TDC 1000 has the added advantage of a faster compensation speed than the first embodiment.

Other advantages of the third embodiment include the ability to fine-tune the dispersion compensation and to tune for a wide range of dispersion. When dispersion compensation occurs with the TDC 900 alone, the compensation value is limited to the discrete values provided by the fixed dispersion compensators 904-1 through 904-n. But coupled to TDC 700, the dispersion value is not so limited. The TDC 700 may be used to fine-tune the dispersion. By combining the fixed dispersion compensator 900 with the TDC 700, tuning for a wider range of dispersion is possible than with either of the compensators alone.

An important aspect of the present invention is the fact that the steps illustrated in FIGS. 5 and 6 are performed automatically, i.e., without the need for a network operator to manually tune the TDC's or to manually analyze the shape of the optical signal. This saves the network operator considerable time and raises the reliability of the network because human error will be minimized.

Figure 11:
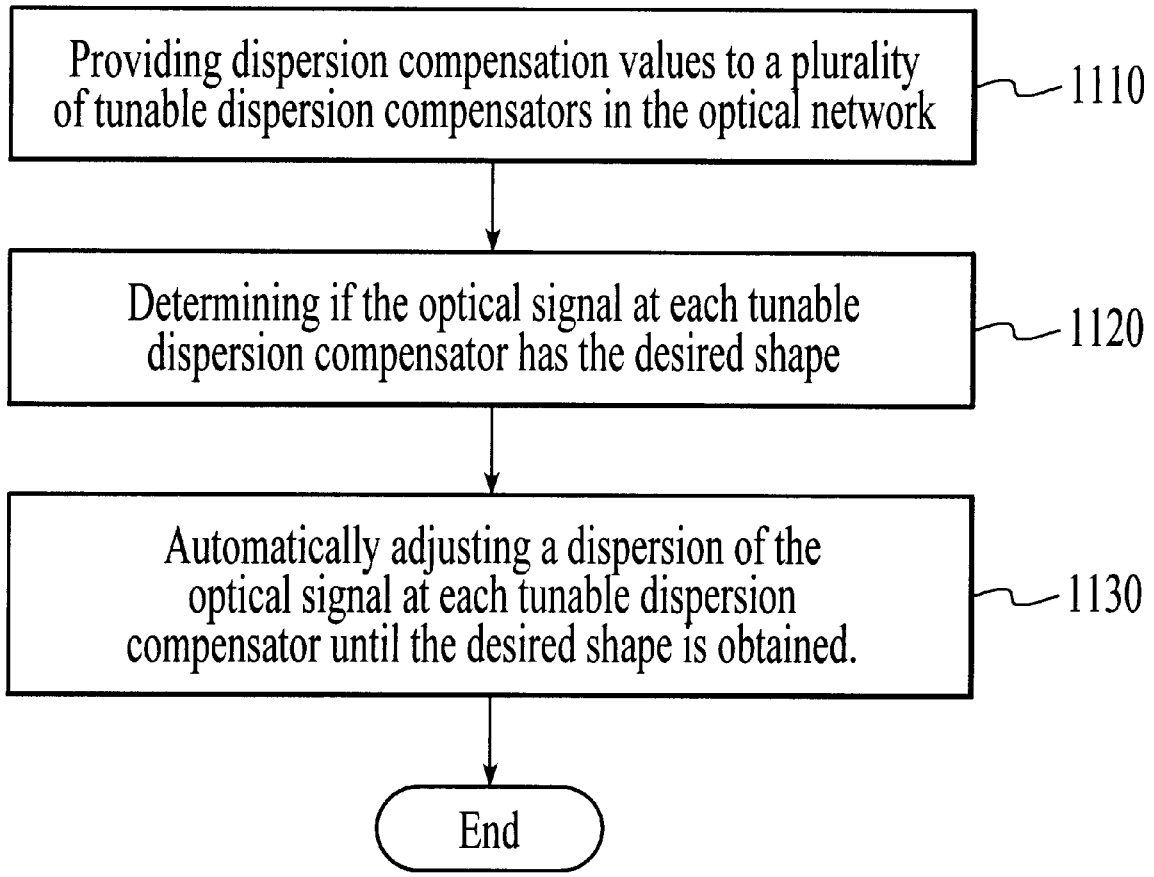
FIG. 11 is a flow chart illustrating a method of providing dispersion compensation to an optical network in accordance with the present invention.

The method of tunable dispersion compensation of the present invention is not limited to use at particular locations in the network. It may be used to provide dispersion compensation for the network as a whole. FIG. 11 is a flow chart illustrating a preferred embodiment of a method of tunable dispersion compensation of the optical network in accordance with the present invention. First, dispersion compensation values are provided to a plurality of TDC's in the optical network, via step 1110. In the preferred embodiment, the values are remotely downloaded to the discretely switched compensators and/or the TDC's. The dispersion values may be provided to these TDC's simultaneously, randomly, or based on some other selective method. Next, it is determined if the optical signal at each of the TDC's has the desired shape, via step 1120. If not, then the dispersion of the optical signal at each of the TDC's is automatically adjusted until the desired shape is obtained, via step 1130.

Figure 12:
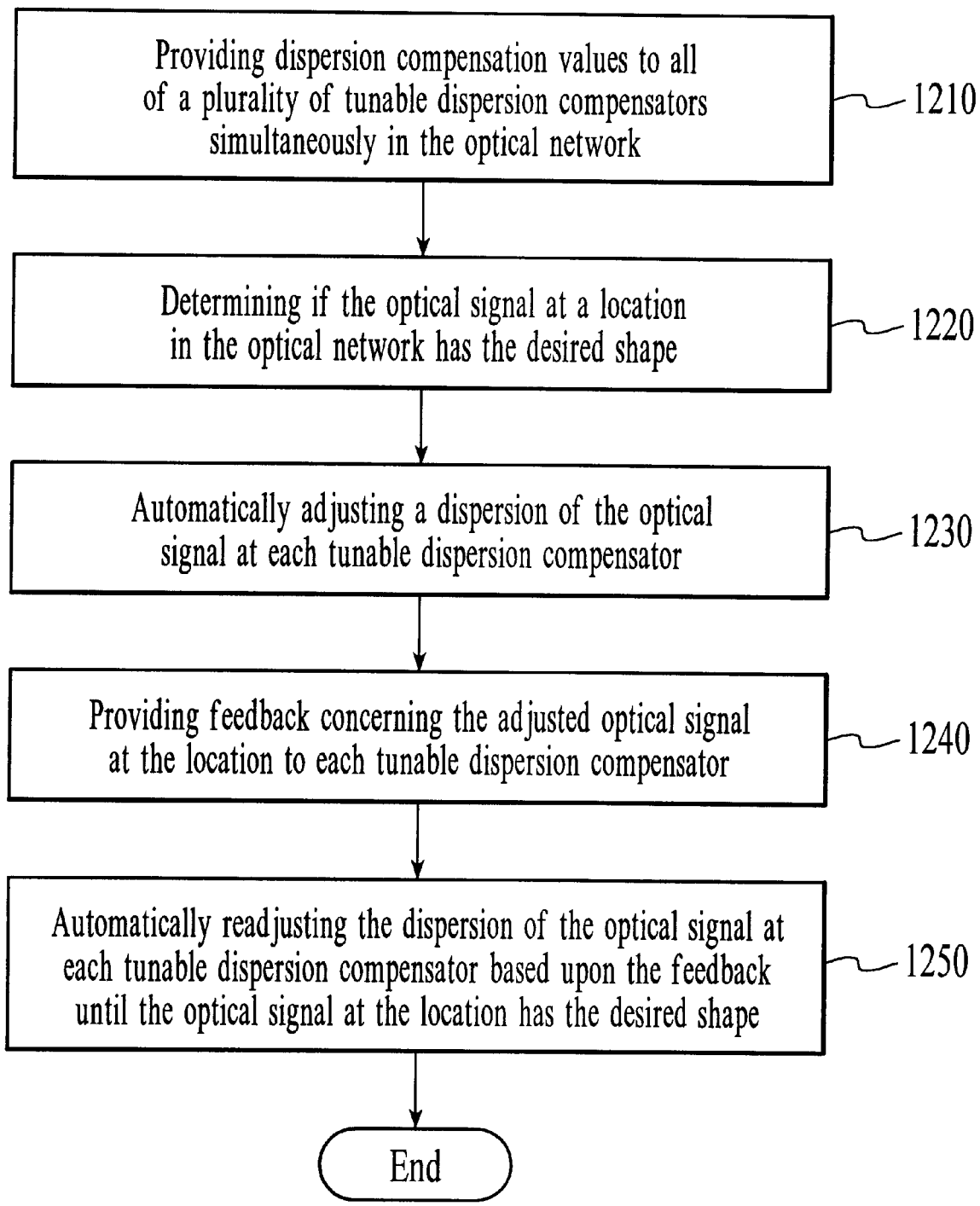
FIG. 12 is a flow chart illustrating a first preferred embodiment of the method of providing dispersion compensation to an optical network in accordance with the present invention.

The dispersion compensation of the optical network can be implemented in several ways. FIG. 12 is a flow chart illustrating a first preferred embodiment of the method of providing tunable dispersion compensation to an optical network in accordance with the present invention. First, dispersion values are provided to all of the TDC's in the network simultaneously, via step 1210. If the network administrator knows the fiber types in the network and the length of the fiber Links, and the dispersion tolerance of the Transmitter/Receiver pair, then the administrator may calculate approximate dispersion compensation values. These values may then be provided to the corresponding TDC's in the network. Next, it is determined if the optical signal at a location in the network has the desired shape, via step 1220. The location may be any point of interest in the network. Then, the dispersion of the optical signal at each TDC is automatically adjusted, via step 1230. Information concerning the adjusted optical signal at the location is fed back to each of the TDC's, via step 1240. The dispersion of the optical signal is then readjusted based upon the feedback information, via step 1560. This feedback and readjustment continues until the optical signal at the location has the desired shape.

Figure 13:
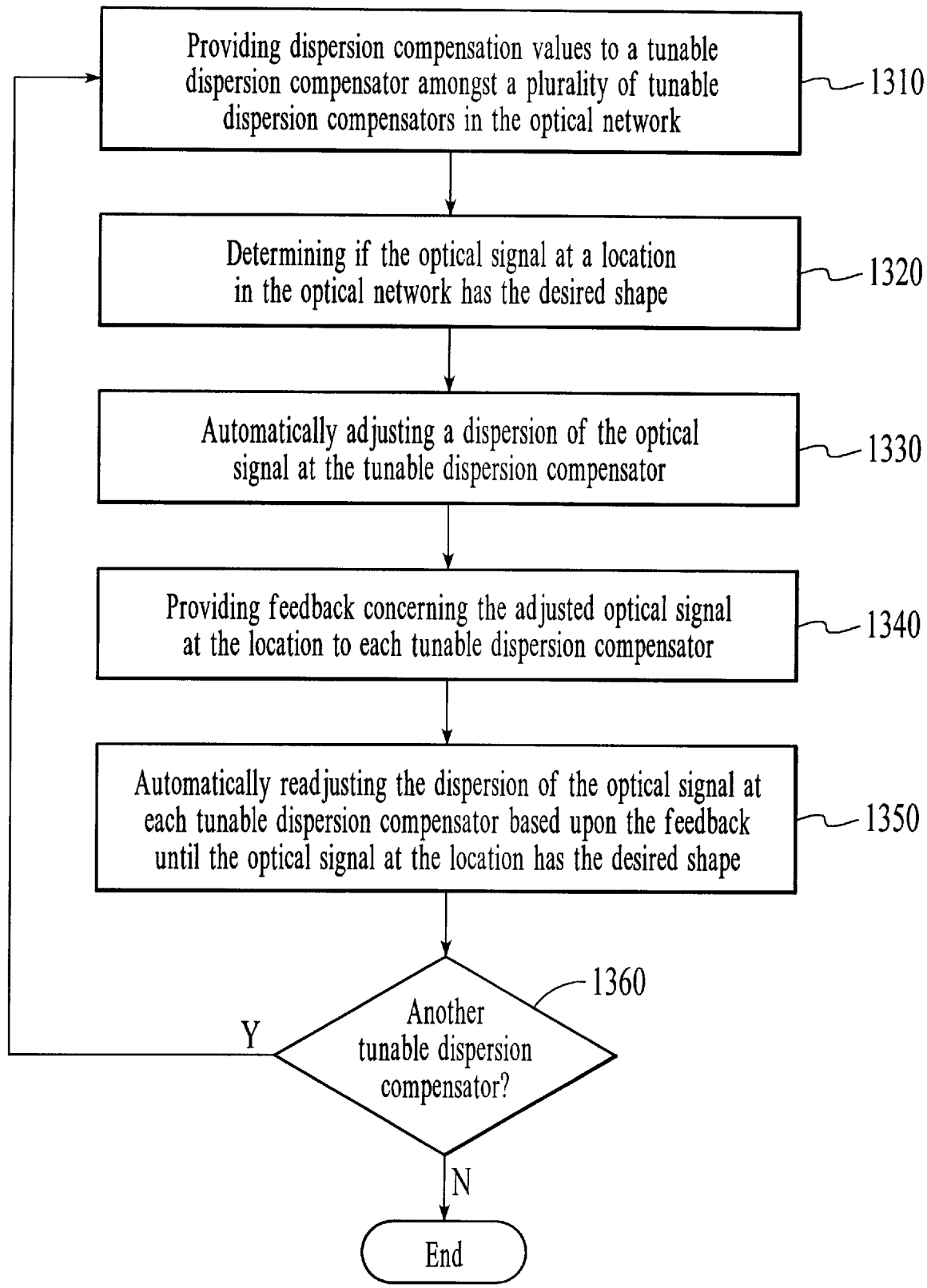
FIG. 13 is a flow chart illustrating a second preferred embodiment of the method of providing dispersion compensation to an optical network in accordance with the present invention.

FIG. 13 is a flow chart illustrating a second preferred embodiment of the method of providing tunable dispersion compensation in the optical network in accordance with the present invention. In this embodiment, dispersion values are provided to the TDC's in the optical network in a sequential manner, i.e., the TDC's tune the dispersion one at a time. First, a dispersion compensation value is provided to one of the TDC's, via step 1310. Next, it is determined if the optical signal at a location in the optical network has the desired shape, via step 1320. The dispersion of the optical signal at the TDC's is then automatically adjusted, via step 1330. Information concerning the adjusted optical signal at the location is fed back to the TDC, via step 1340. Based upon the feedback information, the dispersion is then automatically adjusted, via step 1350. The feedback and readjustment continues until the optical signal has the desired shape. Next, it is determined if there is another TDC in the network, which needs to be adjusted, via step 1360. If there is, then steps 1310–1350 are repeated until there are no more TDC's in the network, which need to be adjusted.

Figure 14:
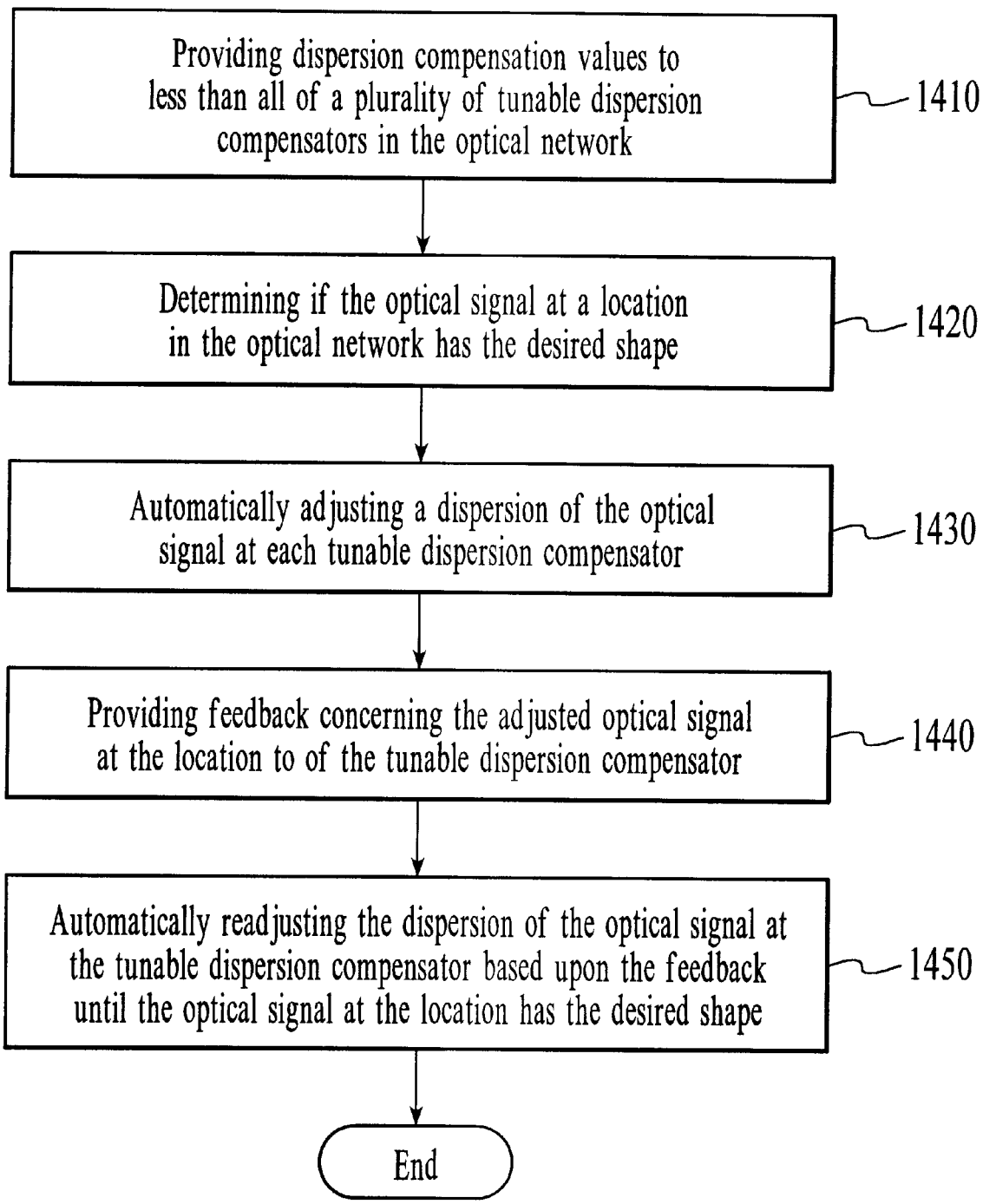
FIG. 14 is a flow chart illustrating a third preferred embodiment of the method of providing dispersion compensation to an optical network in accordance with the present invention.

FIG. 14 is a flow chart illustrating a third preferred embodiment of the method of providing tunable dispersion compensation in the optical network in accordance with the present invention. First, dispersion compensation values are provided to less than all of the TDC's in the optical network, via step 1410. The dispersion values may be provided to these TDC's simultaneously, randomly, or based on some other selective method. Next, it is determined if the optical signal at a location in the network has a desired shape, via step 1420. If not, then the dispersion is automatically adjusted, via step 1430. Feedback is then provided concerning the optical signal at the TDC at the location, via step 1440. Then, the dispersion of the optical signal is automatically readjusted at the TDC based upon the feedback until the optical signal at the location has the desired shape, via step 1450. In this embodiment, dispersion values are provided first to a group of TDC's in the network. Then, the TDC's in the network fine-tune the optical signal.

Which TDC's are provided the dispersion values in the third preferred embodiment in step 1410 may be decided based on several different factors. For example, the group could comprise TDC's relating to a particular fiber type; the group could comprise TDC's with the highest dispersion compensation values; a statistical averaging of the dispersion compensation values may be provided to the a group of TDC's; or the group could comprise TDC's in a particular geographic location in the optical network. Other factors may be used without departing from the spirit and scope of the present invention.

A powerful added advantage of the method of the present invention is the gathering of valuable dispersion information by the EDA 210. This information can be used in various ways to increase the ease in which the optical network may be modified. These ways are disclosed in co-pending U.S. patent application Ser. No. (JAS1018P), filed on Applicant hereby incorporates this Patent Application by reference.

One way the information may be used is to approximate the amount of fiber dispersion in the field in each fiber in the system. For example, in the system illustrated in FIG. 2, the total dispersion of the optical signal as it enters the system at TDC 204 can be determined through the eye optimization function of EDA 210. Also known is the dispersion of the optical signal as it enters TDC 206 and the receiver dispersion tolerance at Transceiver 212. From this information, the approximate (guessed) amount of dispersion in the fiber 214 may be calculated by subtracting the dispersion at TDC 206 and the transceiver 212 from the total dispersion of the signal as it entered the system. The calculation involves taking the total sum of the TDC's for each link and adding (or subtracting the transceiver tolerance) and the result is the fiber link dispersion This calculation may be made for every fiber in a system, and for every system in the network. Thus, in this manner, the amount of fiber link dispersion can be more accurately known for each fiber in the network. Today, the network operator should roll traffic off the link and measure each link using a costly field dispersion measurement system, or the operator measures the link's dispersion as the cable is spliced or installed. This is costly and also results in potential lost revenue while the traffic is being rolled, as well as vast human labor and field coordination activities.

The amount of dispersion for each fiber may then be stored in a database and used to create a network dispersion map. A dispersion map allows for the upgrading or repairing of various systems components with more ease than under conventional dispersion compensation methods. Without this dispersion map, each time an upgrade or repair of a fiber in the system is desired, a network operator must manually measure the dispersion of the system in order to calculate the approximate length of fiber needed for the upgrade or repair so that dispersion in the system is properly compensated. Once the new system is installed, the dispersion compensators are manually adjusted to accommodate the actual dispersion needed by the new system. This will become extremely important for short pulsed systems such as 40 Gb/s. The amount of human labor required is burdensome.

But, with a dispersion map created with the method of the present invention, the approximate dispersion of each fiber of the system is already known. The approximate length of the new fiber necessary for incorporation into the system may be readily calculated. Once the new fiber is installed, the optical signal will be automatically compensated for dispersion by the TDCs to obtain the desired signal shape. Thus, the amount of human labor required is considerably less than under conventional methods. The system may be upgraded or repaired in a shorter amount of time. Also, the operator has virtually no inventory since only a few TDCs are needed for the entire fiber plant.

The dispersion map may be used to provide different dispersion signatures, which may be used to perform other modifications to the optical network. Conventionally, dispersion signatures are obtained utilizing optical fiber modeling software, and the model is then tested in a laboratory. However, with the dispersion signature obtained from the dispersion map of the present invention, the dispersion signature can be modeled based upon real-life values, can be easily downloaded to the TDC's, and dispersion values may be fed back to the TDC's if necessary. The dispersion signature thus reduces the amount of human labor required to modify the optical network.

Another added advantage of the method in accordance with the present invention is the ability to add or "dial in" dispersion to a fiber to change its characteristics. This may be desirable when additional dispersion is required to make the fiber compatible with the remainder of the system. For example, assume a system uses the Dispersion Managed Soliton pulse format for its signal, which is known in the art. This pulse format is designed for use with conventional non-dispersion shifted fibers which have steep dispersion slopes. Other components in the system are thus installed to function with fibers with these characteristics. But, assume that the network operators decide to move the conventional system to a new site where the fibers in the system are Lucent True Wave fibers instead of the conventional non-dispersion shifted fiber. True wave fibers have shallow dispersion slopes in relation to non-dispersion shifted fibers. However, the older system would not be compatible with the true wave fibers because they were designed to function with fibers having non-dispersion shifted fiber characteristics. With the method of the present invention, the network operator may change the characteristics of the true wave fibers by dialing in large, additional dispersion so that they emulate non-dispersion-shifted fibers. In this manner, the true wave fibers are now approximately compatible with the remaining components in the system, or accommodate new pulse formats such as Dispersion Managed Solitons.

The ability to dial in dispersion also provide the network operator with an advantage when switching wavelength channels from one fiber in a link or system to another fiber in another cable link or system. In the future, with optical switching the network operator will be able to switch wavelengths from one fiber to another. The TDC concept will allow the operator to future-proof their network. Sometimes, the other fiber routes or cables support a pulse format or bit rates different than the format of the operating signal. The method of the present invention allows the network operator to pre-tune the network in anticipation of the differences between the signal's format or bit rate, and the other fiber before the switch is actually performed. This affords the operator with quicker maintenance switching, restoration speed, and provisioning times.

A method and system for compensating for chromatic dispersion in an optical network has been disclosed. The method and system of the present invention automatically compensates for dispersion in an optical system. This saves the network operator considerable time and raises the reliability of the network because human error will be minimized. The method and system could be used to provide a continuous range of dispersion compensation to particular locations in the network or to the network as a whole. It has the added advantage of providing network operators with information, which may be stored in a database and used to produce dispersion maps for the network. Dispersion maps help network designers understand and remotely control fiber characteristics when component upgrades or repairs are desired. The dispersion maps provide dispersion signatures useful in performing modifications of the network. It also has the added advantage of providing network operators with the ability to dial in dispersion which is useful for changing the characteristics of the fibers in the system and for pre-tuning a system in a switching of wavelengths from one system to another. Finally, it affords the operator the ability to "guess" at the fiber plant dispersion without consuming valuable time and energy measuring every fiber link.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for compensating for chromatic dispersion in an optical network, comprising the steps of:

(a) analyzing an optical signal at a first location in the optical network;

(b) determining if the optical signal has a desired shape at the first location;

(c) automatically adjusting a dispersion of the optical signal at a second location in the optical network if the optical signal does not have the desired shape;

(d) providing feedback concerning the shape of the adjusted optical signal at the first location; and (e) automatically readjusting the dispersion of the optical signal at the second location based upon the feedback until the optical signal at the first location has the desired shape, wherein the automatically adjusting step (c) and the automatically readjusting step (e) is performed by a tunable dispersion compensator, the tunable dispersion compensator comprising:

a virtually imaged phased array (VIPA), a lens optically coupled to the VIPA, and a mirror optically coupled to the lens, wherein the dispersion compensation may be tuned by adjusting the distances between the VIPA lens, and mirror combination.

2. A method for compensating for chromatic dispersion in an optical network, comprising the steps of:

(a) analyzing an optical signal at a first location in the optical network;

(b) determining if the optical signal has a desired shape at the first location;

(c) automatically adjusting a dispersion of the optical signal at a second location in the optical network if the optical signal does not have the desired shape;

(d) providing feedback concerning the shape of the adjusted optical signal at the first location; and (e) automatically readjusting the dispersion of the optical signal at the second location based upon the feedback until the optical signal at the first location has the desired shape, wherein the automatically adjusting step (c) and the automatically readjusting step (e) is performed by a tunable dispersion compensator, the tunable dispersion compensator comprising:

a first tunable dispersion compensator capable of providing a fixed amount of dispersion compensation, and a second tunable dispersion compensator, coupled to the first tunable dispersion compensator, capable of providing a continuous range of dispersion compensation, wherein the second tunable dispersion compensator comprises:

a virtually imaged phased array (VIPA), a lens optically coupled to the VIPA, and a mirror optically coupled to the lens, wherein the dispersion compensation may be tuned by adjusting the distances between the VIPA lens, and mirror combination.

3. A system for compensating for chromatic dispersion in an optical network, comprising:

an optical signal analyzer at a first location in the optical network for determining a shape of the optical signal at the first location;

a tunable dispersion compensator capable of providing a continuous range of dispersion compensation at a second location in the optical network, wherein the tunable dispersion compensator comprises:

a virtually imaged phased array (VIPA), a lens optically coupled to the VIPA, and a mirror optically coupled to the lens, wherein the dispersion compensation may be tuned by adjusting the distances between the VIPA lens, and mirror combination; and a link coupled to the tunable dispersion compensator and the optical signal analyzer for providing feedback from the optical signal analyzer to the tunable dispersion compensator concerning the shape of the optical signal at the first location, wherein a dispersion of the optical signal is adjusted by the tunable dispersion compensator based upon the feedback until the optical signal has a desired shape.

4. A system for compensating for chromatic dispersion in an optical network, comprising:

an optical signal analyzer at a first location in the optical network for determining a shape of the optical signal at the first location;

a tunable dispersion compensator capable of providing a continuous range of dispersion compensation at a second location in the optical network, wherein the tunable dispersion compensator comprises:

a first tunable dispersion compensator capable of providing a fixed amount of dispersion compensation, and a second tunable dispersion compensator, coupled to the first tunable dispersion compensator, capable of providing a continuous range of dispersion compensation, wherein the second tunable dispersion compensator comprises:

a virtually imaged phased array (VIPA), a lens optically coupled to the VIPA, and a mirror optically coupled to the lens, wherein the dispersion compensation may be tuned by adjusting the distances between the VIPA lens, and mirror combination; and a link coupled to the tunable dispersion compensator and the optical signal analyzer for providing feedback from the optical signal analyzer to the tunable dispersion compensator concerning the shape of the optical signal at the first location, wherein a dispersion of the optical signal is adjusted by the tunable dispersion compensator based upon the feedback until the optical signal has a desired shape.

5. A method for compensating for chromatic dispersion in an optical network, comprising the steps of:

(a) analyzing an optical signal at a first location in the optical network;

(b) determining if the optical signal has a desired shape at the first location;

(c) automatically adjusting a dispersion of the optical signal utilizing a tunable dispersion compensator at a second location in the optical network if the optical signal does not have the desired shape, wherein the tunable dispersion compensator comprises:

a virtually imaged phased array (VIPA), a lens optically coupled to the VIPA, and a mirror optically coupled to the lens, wherein the dispersion compensation may be tuned by adjusting the distances between the VIPA lens, and mirror combination;

(d) providing feedback concerning the shape of the adjusted optical signal at the first location; and (e) automatically readjusting the dispersion of the optical signal based upon the feedback until the desired shape at the first location is obtained.

6. A method for compensating for chromatic dispersion in an optical network, comprising the steps of:

(a) analyzing an optical signal at a first location in the optical network;

(b) determining if the optical signal has a desired shape at the first location;

(c) automatically adjusting a dispersion of the optical signal utilizing a tunable dispersion compensator at a second location in the optical network if the optical signal does not have the desired shape, wherein the tunable dispersion compensator comprises:

a first tunable dispersion compensator capable of providing a fixed amount of dispersion compensation; and a second tunable dispersion compensator, coupled to the first tunable dispersion compensator, capable of providing a continuous range of dispersion compensation, wherein the second tunable dispersion compensator comprises:

a virtually imaged phased array (VIPA),
   a lens optically coupled to the VIPA, and
   a mirror optically coupled to the lens, wherein the dispersion compensation may be tuned by adjusting the distances between the VIPA lens, and mirror combination;

(d) providing feedback concerning the shape of the adjusted optical signal at the first location; and (e) automatically readjusting the dispersion of the optical signal based upon the feedback until the desired shape at the first location is obtained.

7. A system for compensating for chromatic dispersion in an optical network, comprising:

means for analyzing an optical signal at a first location in the optical network;

means for determining if the optical signal has a desired shape at the first location;

means for automatically adjusting a dispersion of the optical signal utilizing a tunable dispersion compensator at a second location in the optical network if the optical signal does not have the desired shape, wherein the tunable dispersion compensator comprises:

a virtually imaged phased array (VIPA),
   a lens optically coupled to the VIPA, and
   a mirror optically coupled to the lens, wherein the dispersion compensation may be tuned by adjusting the distances between the VIPA lens, and mirror combination; and means for providing feedback concerning the shape of the adjusted optical signal at the first location, wherein the dispersion of the optical signal may be readjusted based upon the feedback until the optical signal at the first location has the desired shape.

8. A system for compensating for chromatic dispersion in an optical network, comprising:

means for analyzing an optical signal at a first location in the optical network;

means for determining if the optical signal has a desired shape at the first location;

means for automatically adjusting a dispersion of the optical signal utilizing a tunable dispersion compensator at a second location in the optical network if the optical signal does not have the desired shape, wherein the tunable dispersion compensator comprises:

a first tunable dispersion compensator capable of providing a fixed amount of dispersion compensation, and a second tunable dispersion compensator, coupled to the first tunable dispersion compensator, capable of providing a continuous range of dispersion compensation, wherein the second tunable dispersion compensator comprises:

a virtually imaged phased array (VIPA),
      a lens optically coupled to the VIPA, and
      a mirror optically coupled to the lens, wherein the dispersion compensation may be tuned by adjusting the distances between the VIPA lens, and mirror combination; and means for providing feedback concerning the shape of the adjusted optical signal at the first location, wherein the dispersion of the optical signal may be readjusted based upon the feedback until the optical signal at the first location has the desired shape.

9. A method for compensating for chromatic dispersion in an optical network, comprising the steps of:

(a) obtaining parameters of the optical network;

(b) calculating an initial set point for adjustment of an optical signal;

(c) sending the adjustment command to a tunable dispersion compensator at a first location, the tunable dispersion compensator capable of providing a continuous range of dispersion compensation, wherein the tunable dispersion compensator comprises:

a virtually imaged phased array (VIPA),
   a lens optically coupled to the VIPA, and
   a mirror optically coupled to the lens, wherein the dispersion compensation may be tuned by adjusting the distances between the VIPA lens, and mirror combination;

(d) analyzing a shape of the optical signal at a second location;

(e) determining if the optical signal has a desired shape at the second location;

(f) automatically adjusting a dispersion of the optical signal at the first location if the optical signal does not have the desired shape;

(g) providing feedback concerning a shape of the adjusted optical signal at the second location; and (h) automatically readjusting the dispersion compensation of the optical signal at the first location based upon the feedback until the optical signal at the second location has the desired shape.

10. A method for compensating for chromatic dispersion in an optical network, comprising the steps of:

(a) obtaining parameters of the optical network;

(b) calculating an initial set point for adjustment of an optical signal;

(c) sending the adjustment command to a tunable dispersion compensator at a first location, the tunable dispersion compensator capable of providing a continuous range of dispersion compensation, wherein the tunable dispersion compensator comprises:

a first tunable dispersion compensator capable of providing a fixed amount of dispersion compensation; and a second tunable dispersion compensator, coupled to the first tunable dispersion compensator, capable of providing a continuous range of dispersion compensation, wherein the second tunable dispersion compensator comprises:

a virtually imaged phased array (VIPA),
   a lens optically coupled to the VIPA, and
   a mirror optically coupled to the lens, wherein the dispersion compensation may be tuned by adjusting the distances between the VIPA lens, and mirror combination;

(d) analyzing a shape of the optical signal at a second location;

(e) determining if the optical signal has a desired shape at the second location;

(f) automatically adjusting a dispersion of the optical signal at the first location if the optical signal does not have the desired shape;

(g) providing feedback concerning a shape of the adjusted optical signal at the second location; and (h) automatically readjusting the dispersion compensation of the optical signal at the first location based upon the feedback until the optical signal at the second location has the desired shape.

* * * * *